United States Patent
Chou et al.

(10) Patent No.: US 11,600,420 B2
(45) Date of Patent: Mar. 7, 2023

(54) SIGNAL CONVERTER

(71) Applicant: OptoMedia Technology Inc., Zhubei (TW)

(72) Inventors: Hui Tsuo Chou, Zhubei (TW); Pei Hsiang Hsu, Zhubei (TW)

(73) Assignee: OPTOMEDIA TECHNOLOGY INC., Zhubei (TW)

( * ) Notice: Subject to any disclaimer, the term of this patent is extended or adjusted under 35 U.S.C. 154(b) by 0 days.

(21) Appl. No.: 17/485,862

(22) Filed: Sep. 27, 2021

(65) Prior Publication Data

US 2022/0102046 A1  Mar. 31, 2022

Related U.S. Application Data

(60) Provisional application No. 63/083,990, filed on Sep. 27, 2020.

(51) Int. Cl.
*H01F 19/08* (2006.01)
*H04B 10/299* (2013.01)

(52) U.S. Cl.
CPC .......... *H01F 19/08* (2013.01); *H04B 10/299* (2013.01); *H01F 2019/085* (2013.01)

(58) Field of Classification Search
CPC ............... H01F 19/08; H01F 2019/085; H01F 27/2823; H04B 10/299; G02B 6/4275; G02B 6/4277
See application file for complete search history.

(56) References Cited

U.S. PATENT DOCUMENTS

2017/0343463 A1* 11/2017 Minami .................. F02D 41/22

FOREIGN PATENT DOCUMENTS

EP          1950848 A1 *  7/2008  ............. H01F 19/08

* cited by examiner

*Primary Examiner* — Pinping Sun
*Assistant Examiner* — Aqeel H Bukhari
(74) *Attorney, Agent, or Firm* — Chun-Ming Shih; HDLS IPR Services

(57) ABSTRACT

The present disclosure provides a signal convertor, which includes a circuit board, a plurality of isolation transformers, a capacitor, a signal-converting module, an electrical connection interface and a plugging interface. The isolation transformers, the capacitor, the signal-converting module are disposed on the circuit board. The signal-converting module is for converting a plugging signal received from the plugging interface into an electrical signal and transferring the electrical signal to the isolation transformers, or for converting the electrical signal received from the isolation transformers into the plugging signal and transferring the plugging signal to the plugging interface.

8 Claims, 4 Drawing Sheets

SIGNAL CONVERTER

CROSS-REFERENCE TO RELATED APPLICATIONS

This non-provisional application claims priority claim under 35 U.S.C. § 119(e) on U.S. Provisional Patent Application No. 63/083,990 filed on Sep. 27, 2020, the entire contents of which are incorporated herein by reference.

TECHNICAL FIELD

The present disclosure relates to a signal convertor, more particularly a signal convertor with effective electrostatic Discharge (ESD) and electromagnetic compatibility (EMC) performances.

BACKGROUND

As network technology develops and evolves, fiber-optic communication has replaced the conventional copper-cable communication and become the main stream technology for data transfer. The fiber-optic communication has many advantages, such as transferring data in a fast rate and long range, moreover with durability against electromagnetic interference (EMI) and high safety, etc.

Generally, the fiber-optic communication technology main employs a light-emitting/receiving module, which is includes signal convertor (e.g. optical-electrical convertor), optical switch and optoelectonics. In the signal convertor, an isolation transformers is commonly disposed to form galvanic isolation between an input and an output of the signal convertor, such that to reduce and prevent high-frequency noise or spikes from affecting those electronic devices or equipments connected to the signal convertor.

However, isolation transformers in conventional signal convertors, which commonly employ copper wires with relatively thick wire diameter (e.g. 0.5 mm), such that to result in relatively large sizes, volumes of the isolation transformers. For example, a conventional isolation transformer is formed with a volume of proximately length (L)×width (W)×height (H)=14.62 mm (millimeter)×10.2 mm×4.24 mm. Therefore, as electronics are produced smaller and smaller nowadays, the signal convertors are required to be smaller too, and therewith circuit boards (e.g. print circuit board, PCB) within the signal convertors hence also have more limited area sizes. The conventional isolation transformers made of thick wires can take large areas on the circuit boards, such that the circuit boards have no area for mounting hi-voltage capacitors (e.g. 2 KV capacitors) and thus incapable of hi-voltage withstand test, such as high pass Hi-PoT (IEEE802.3af Clause 33.4.1 Isolation).

Meanwhile, as the signal convertors become smaller, electronic components within the signal convertors also become closer to metal housings of signal convertors, such that when passing with electricity, the electronic components may contact the metal housings and cause grounding effect, or electric arc may be formed therebetween, such that to maliciously affect performance and quality of the signal convertors, or even cause damage thereto.

Therefore, the present disclosure provides a new signal convertor, which can reduce the size of the isolation transformers therein, in order to improve and solve the aforementioned drawback and problems.

SUMMARY

According to an object for improving the aforementioned drawbacks, the present disclosure provides a signal convertor with effective electrostatic Discharge (ESD) and electromagnetic compatibility (EMC) performances. The signal convertor includes a circuit board, a plurality of isolation transformers, an electrical-connection interface and a plugging interface. The isolation transformers are disposed on the circuit board, the isolation transformers are for forming galvanic isolation between the electrical connection interface and the plugging interface. The isolation transformers made of materials including copper wires which are formed with relatively thin wire diameters, such that the isolation transformers have relatively small sizes, and hence to maintain enough areas on surface of the circuit board for mounting hi-voltage capacitors, and for a capability of high-voltage capacitors An object of the present disclosure is to provide the aforementioned signal convertor with effective ESD and EMC performances, wherein the circuit board is coated with an isolation layer which covers the circuit board along with those electronic components thereon (the isolation transformers, the capacitor and the signal-converting module). By virtue of the isolation layer which has high impedance, the electronic components on the circuit board are isolated from a metal housing of the signal convertor, in order to prevent electric arc or grounding effect by contact for improving performance stability of the signal convertor.

To achieve the aforementioned object, the present disclosure provides a signal convertor, which includes: a circuit board, a plurality of isolation transformers disposed on the circuit board; a capacitor disposed on the circuit board, wherein each of the isolation transformers are connected to the capacitor; an electrical connection interface connected to the isolation transformers; an plugging interface; and a signal-converting module disposed on the circuit board and interconnecting the plugging interface and the isolation transformers, for converting a plugging signal received by the plugging interface into an electrical signal and transferring the electric signal to the isolation transformers, or for converting an electrical signal received by the isolation transformers into an plugging signal and transferring the plugging signal to the plugging interface.

In one embodiment of the present disclosure, a number of the isolation transformers is four.

In one embodiment of the present disclosure, the isolation transformers are made of materials including copper wires, which are formed with wire diameters of 0.2 mm.

In one embodiment of the present disclosure, the signal convertor further includes an isolation layer which covers the circuit board, the isolation transformers, the capacitor and the signal-converting module.

In one embodiment of the present disclosure, the isolation layer is formed with a thickness in a range of 0.025 mm 0.075 mm.

In one embodiment of the present disclosure, the isolation layer is formed with a thickness of 0.05 mm.

In one embodiment of the present disclosure, the isolation layer is made of phenol formaldehyde resin, epoxy modified alkyd resin, polyester resin, organic silicon resin, polyimide resin or polyphenylene ether resin.

In one embodiment of the present disclosure, the electrical connection interface is an RJ45 connector, a universal serial bus (USB) connector, a coaxial cable, or any other transfer interface for transferring electrical signal.

BRIEF DESCRIPTION OF THE DRAWINGS

The structure as well as preferred modes of use, further objects, and advantages of this present disclosure will be best understood by referring to the following detailed description of some illustrative embodiments in conjunction with the accompanying drawings, in which.

DETAILED DESCRIPTION OF THE PREFERRED EMBODIMENTS

Figure 1:
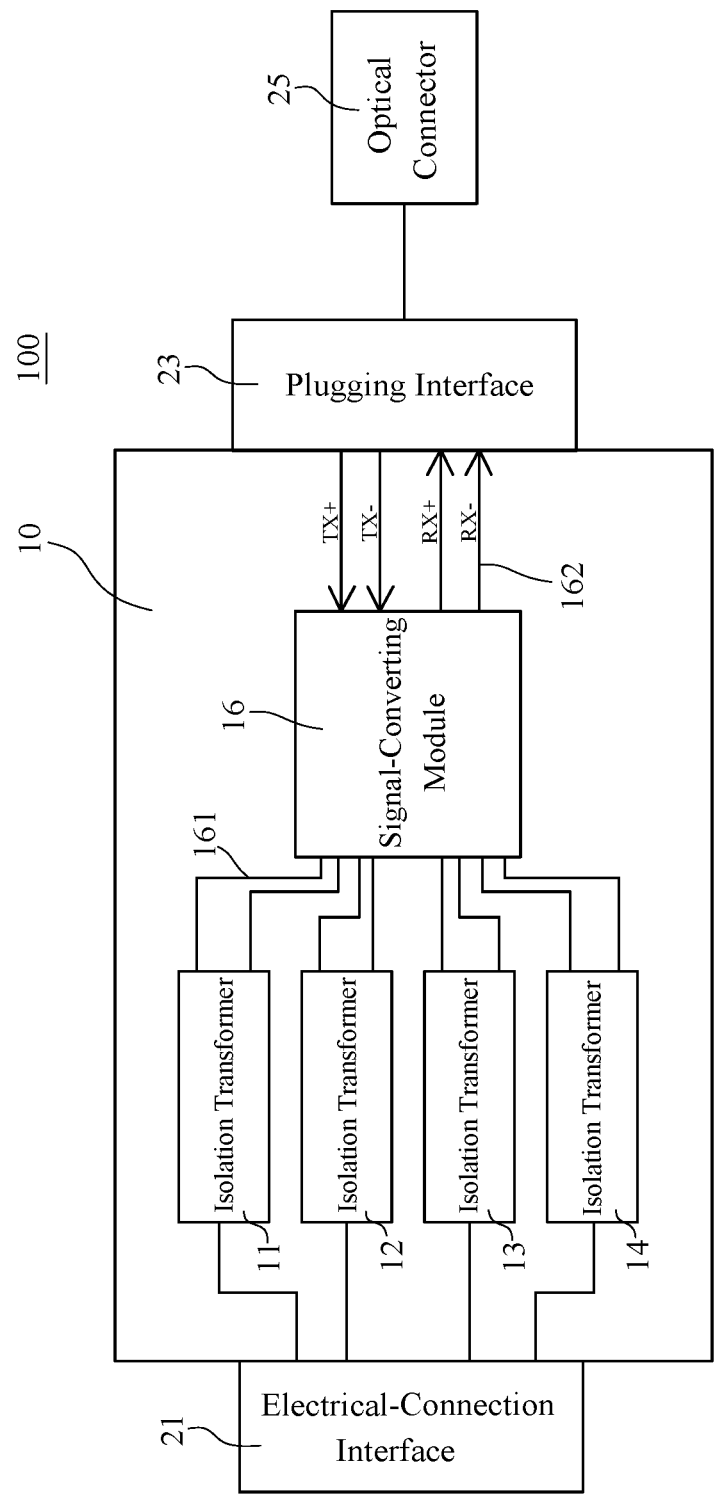
FIG. 1 is a schematic diagram of a signal convertor according to one embodiment of the present disclosure.
Figure 2:
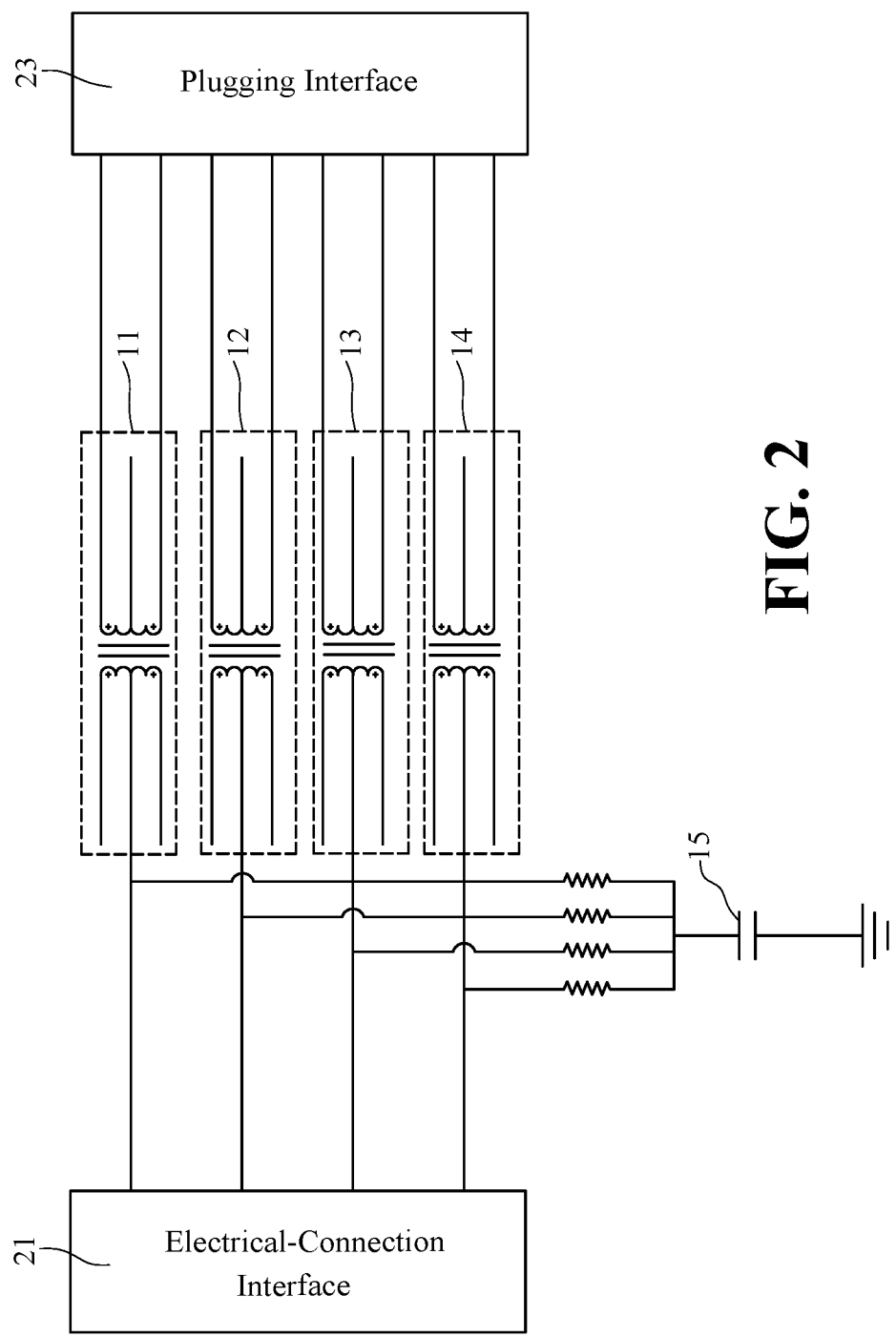
FIG. 2 is a circuit diagram of the signal convertor according to one embodiment of the present disclosure.

Referring to FIG. 1 and FIG. 2, which are respectively a FIG. 1 is a schematic diagram of a signal convertor, and a circuit diagram of the signal convertor according to one embodiment of the present disclosure. As shown in FIG. 1 and FIG. 2, the signal convertor 100 according to the present disclosure includes a circuit board 10, a plurality of isolation transformers 11, 12, 13, 14, an electrical connection interface 21 and a plugging interface 23. The circuit board 10 may be a printed circuit board (PCB) or a substrate. The isolation transformers 11, 12, 13, 14 are highly effective isolation transformers, each of the isolation transformers 11, 12, 13, 14 has a turn ratio ($N_P$:$N_S$) of 1:1. By virtue of the isolation transformers 11, 12, 13, 14, galvanic isolation can be formed between the electrical connection interface 21 and the plugging interface 23.

The electrical connection interface 21 may be an RJ45 connector, a universal serial bus (USB) connector, a coaxial cable or any other transfer interface for transferring electric signal. The electrical connection interface 21 can be electrically connected to an electronic device (not shown) for receiving and sending electrical signal. The plugging interface 23 may be a small-form-factor-pluggable (SFP) interface optically connected to an external optical connector 25. The optical connector 25 may be a square connector, a ferrule connector, straight tip connector, local connector, a miniature unit coupling or any other transfer interface for transferring optical signal. The plugging interface 23 receives an optical signal from the optical connector 25, and converts the optical signal into a plugging signal.

Furthermore, the signal convertor 100 according to the present disclosure includes a signal-converting module 16, which is disposed on the circuit board 10 and interconnects the plugging interface 23 and the isolation transformers 11, 12, 13, 14. The signal-converting module 16 is connected to the isolation transformers 11, 12, 13, 14 respectively via parallel signal lines 161, and also connected to the plugging interface 23 via serial signal lines 162. The signal-converting module 16 can convert a plugging signal received from the plugging interface 23 into an electrical signal, and transfer the electrical signal to the isolation transformers 11, 12, 13, 14. Alternatively, the signal-converting module 16 can also convert an electrical signal received from the isolation transformers 11, 12, 13, 14 into a plugging signal, and transfer the plugging signal to the plugging interface 23.

In order to be capable of high-voltage withstand test, the signal convertor 100 according to the present disclosure is also disposed with a capacitor 15, wherein the capacitor 15 is a high-voltage capacitor (e,g. 2 KV capacitor). Moreover, each of the isolation transformers 11, 12, 13, 14 is electrically connected to the capacitor 15 via a resistor. With such connection, by virtue the high-voltage isolation transformers 11, 12, 13, 14 and capacitor 15, the signal convertor 100 according to the present disclosure can be capable of the high-voltage withstand test, and hence to have high performance of electrostatic discharge (ESD) and electromagnetic compatibility (EMC).

Specifically, The isolation transformers 11, 12, 13, 14 according to the present disclosure are made of materials which include copper wires, and wherein each of the copper wires is formed with a relatively thin wire diameter, such as 0.2 millimeter (mm). Such that, each of the isolation transformers 11, 12, 13, 14 can have a relatively small size, with a dimensional specification of proximately length (L)×width (W)×height (H)=3.1 mm×3.1 mm×3.9 mm, for example. Therewith, a total area usage of the four isolation transformers 11, 12, 13, 14 made with thin copper wires (wire diameter=0.2 mm) is 3.1 mm×3.1 mm×4, which can be proximately one-fourth of that of one conventional isolation transformer made with thick copper wires (wire diameter=0.5 mm, area usage=14.6 mm×10.2 mm), therefore calculated in percentage as 0.258%. Thereby, when the four small isolation transformers 11, 12, 13, 14 are disposed, mounted on the circuit board 10, the circuit board 10 still have enough for mounting the high-voltage capacitor 15.

Figure 3:
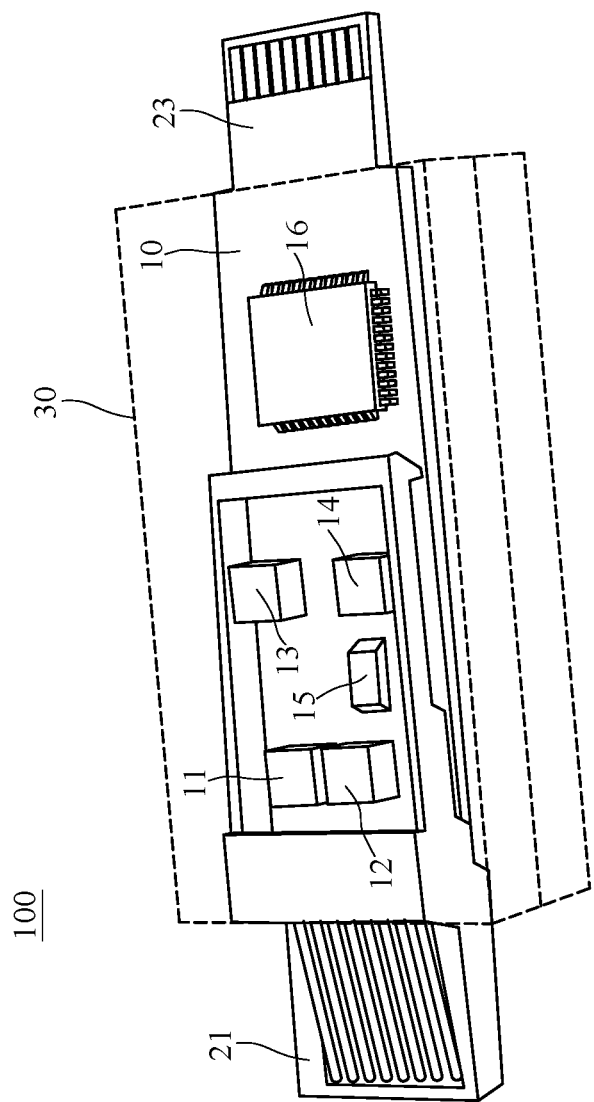
FIG. 3 is a perspective view of the signal convertor according to one embodiment of the present disclosure.
Figure 4:
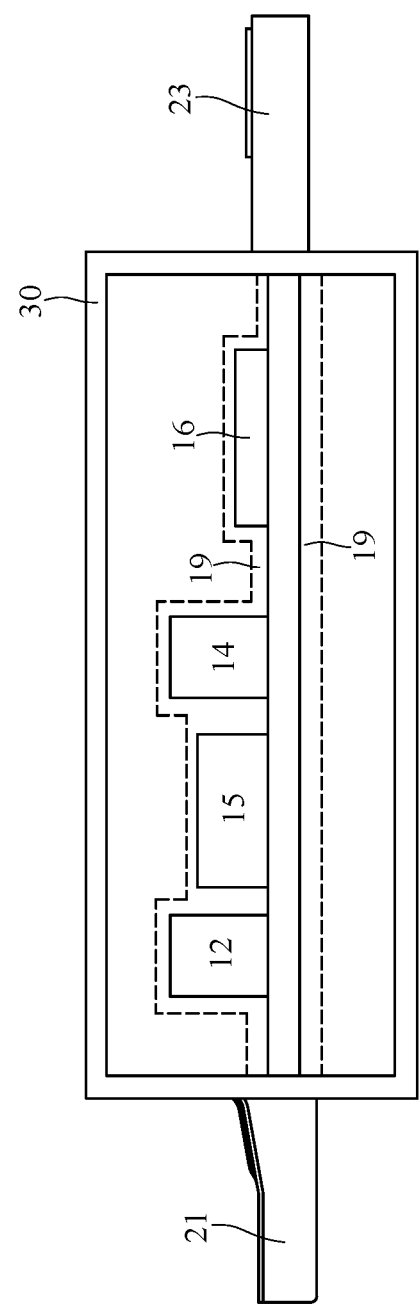
FIG. 4 is a cross-sectional view of the signal convertor according to one embodiment of the present disclosure.

As shown in FIG. 3 and FIG. 4, in practical use, the signal convertor 100 of the present disclosure is further disposed with a metal housing 30. The circuit board 10 is disposed within and contained by the metal housing 30, such that circuit board 10 and those electronic components 11, 12, 13, 14, 15, 16 thereon are protected by the metal housing 30.

Along with the trend of making electronic devices smaller, the signal convertor 100 is also required to be smaller, such that spaces between the metal housing 30 and those electronic components 11, 12, 13, 14, 15, 16 on the circuit board 10 also become smaller, tighter, this may cause undesired electric arc or grounding effect by an electrical conduct therebetween. To prevent the undesired effects, the circuit board 10 according to the present disclosure is coated with an isolation layer 19, which also covers those electronic components 11, 12, 13, 14, 15, 16 thereon. The isolation layer 19 may be made of several types of resin material, such as phenol formaldehyde resin, epoxy modified alkyd resin, polyester resin, organic silicon resin, polyimide resin or polyphenylene ether resin, etc. The isolation layer 19 is formed with a thickness in a range of 0.025 mm 0.075 mm, and preferably 0.05 mm. In one embodiment of the present disclosure, the circuit board 10 may be dipped into liquid resin material, and then be dried up to form the isolation layer 19 thereon.

By virtue of the isolation layer 19 which has high impedance, those electronic components 11, 12, 13, 14, 15, 16 on the circuit board 10 are insulated from the metal housing 30, such that to prevent the undesired electric arc and grounding effect therebetween, and hence the signal convertor 100 can convert signals in a more stable manner.

In summary, the present disclosure provides a signal convertor with effective ESD and EMC performances, which is capable of high-voltage withstand test, and which can prevent undesired electric arc or grounding effect by electrical conduct between a metal housing thereof and electronic components on a circuit board within the metal housing. Such that, the signal convertor can convert signals in a more stable manner, and also prevent damage to the electronic components.

The above disclosure is only the preferred embodiment of the present disclosure, and not used for limiting the scope of the present disclosure. All equivalent variations and modifications on the basis of shapes, structures, features and spirits described in claims of the present disclosure should be included in the claims of the present disclosure.

We claim:

1. A signal convertor, comprising:
   a circuit board;
   a plurality of isolation transformers disposed on the circuit board;
      a capacitor disposed on the circuit board, wherein each of the isolation transformers is electrically connected to the capacitor;
      an electrical-connection interface electrically connected to the isolation transformers;
      a plugging interface;
      a signal-converting module disposed on the circuit board and interconnects the plugging interface and the isolation transformers for converting a plugging signal received from the plugging interface into an electrical signal and transferring the electrical signal to the isolation transformers, or for converting the electrical signal received from the isolation transformers into the plugging signal and transferring the plugging signal to the plugging interface; and
      an isolation layer for covering the circuit board, the isolation transformers, the capacitor, and the signal-converting module;
   wherein the isolation transformers are made of materials comprising copper wires; and each of the copper wires is formed with a wire diameter of 0.2 mm.

2. The signal convertor according to claim 1, wherein a number of the isolation transformers is four.

3. The signal convertor according to claim 1, wherein the isolation layer is formed with a thickness in a range of 0.025 mm~0.075 mm.

4. The signal convertor according to claim 3, wherein the thickness of isolation layer is 0.05 mm.

5. The signal convertor according to claim 1, wherein the isolation layer is made of phenol formaldehyde resin, epoxy modified alkyd resin, polyester resin, organic silicon resin, polyimide resin, or polyphenylene ether resin.

6. The signal convertor according to claim 1, wherein the electrical connection interface is an RJ45 connector, a universal serial bus connector, a coaxial cable, or any other transfer interface for transferring the electrical signal.

7. The signal convertor according to claim 1, wherein the plugging interface is optically connected to an optical connector; and the optical connector is a square connector, a ferrule connector, a straight tip connector, a local connector, a miniature unit coupling, or any other transfer interface for transferring the plugging signal.

8. The signal convertor according to claim 1, wherein the plugging interface is a small-form-factor-pluggable interface.

* * * * *